(12) United States Patent
Nishimura et al.

(10) Patent No.: US 9,089,919 B2
(45) Date of Patent: *Jul. 28, 2015

(54) WELDED STEEL PIPE FOR LINEPIPE WITH HIGH COMPRESSIVE STRENGTH AND MANUFACTURING METHOD THEREOF

(75) Inventors: Kimihiro Nishimura, Chiyoda-ku (JP); Nobuyuki Ishikawa, Fukuyama (JP); Akihiko Tanizawa, Fukuyama (JP); Hitoshi Sueyoshi, Fukuyama (JP); Masayuki Horie, Fukuyama (JP); Yasumitsu Kiyoto, Fukuyama (JP)

(73) Assignee: JFE Steel Corporation, Chiyoda-Ku (JP)

( * ) Notice: Subject to any disclaimer, the term of this patent is extended or adjusted under 35 U.S.C. 154(b) by 207 days.

This patent is subject to a terminal disclaimer.

(21) Appl. No.: 13/511,826

(22) PCT Filed: Nov. 25, 2010

(86) PCT No.: PCT/JP2010/071528
§ 371 (c)(1),
(2), (4) Date: Aug. 3, 2012

(87) PCT Pub. No.: WO2011/065579
PCT Pub. Date: Jun. 3, 2011

(65) Prior Publication Data
US 2012/0285576 A1 Nov. 15, 2012

(30) Foreign Application Priority Data
Nov. 25, 2009 (JP) .................. 2009-267257

(51) Int. Cl.
C22C 38/12 (2006.01)
C22C 38/14 (2006.01)
(Continued)

(52) U.S. Cl.
CPC ............... *B23K 9/0282* (2013.01); *B23K 9/18* (2013.01); *C21D 8/10* (2013.01); *C21D 8/105* (2013.01); *C22C 38/06* (2013.01); *C22C 38/12* (2013.01); *C22C 38/14* (2013.01); *C21D 2211/002* (2013.01)

(58) Field of Classification Search
None
See application file for complete search history.

(56) References Cited

FOREIGN PATENT DOCUMENTS

EP 1662014 5/2006
EP 1995339 11/2008
(Continued)

OTHER PUBLICATIONS

Machine-English translation of Japanese patent 2009-052137, Ishikawa Nobuyuki et al. Mar. 12, 2009.*

(Continued)

*Primary Examiner* — Deborah Yee
(74) *Attorney, Agent, or Firm* — RatnerPrestia (57) ABSTRACT

Provided are a steel pipe for a linepipe with high compressive strength and a heavy wall thickness, and a method of manufacturing the same. Lowering of yield stress caused by a Bauschinger effect can be suppressed by optimizing the metal microstructure of a steel plate without requiring particular forming conditions in forming the steel pipe, and without requiring heat treatment after pipe making. A steel pipe has the composition which contains by mass % 0.03 to 0.10% C, 0.30% or less Si, 1.00 to 2.00% Mn, 0.015% or less P, 0.003% or less S, 0.080% or less Al, 0.005 to 0.035% Nb, 0.005 to 0.020% Ti, and Fe and unavoidable impurities as a balance. The steel pipe has metal microstructure where a fraction of bainite is 60% or more, a fraction of rolled ferrite is 5% or less, and a fraction of M-A constituent (MA) is 3% or less.

5 Claims, 1 Drawing Sheet (51) Int. Cl.

| | |
|---|---|
| *C22C 38/04* | (2006.01) |
| *C21D 8/10* | (2006.01) |
| *C21D 9/08* | (2006.01) |
| *B23K 9/028* | (2006.01) |
| *B23K 9/18* | (2006.01) |
| *C22C 38/06* | (2006.01) |

(56) References Cited

FOREIGN PATENT DOCUMENTS

| | | |
|---|---|---|
| EP | 2224028 A1 * | 9/2010 |
| EP | 2505681 A1 | 10/2012 |
| EP | 2505682 | 10/2012 |
| EP | 2505683 A1 | 10/2012 |
| JP | 9-049025 A | 2/1997 |
| JP | 2002-102931 A | 4/2002 |
| JP | 2003-340518 A | 12/2003 |
| JP | 2003-340519 A | 12/2003 |
| JP | 2003-342639 A | 12/2003 |
| JP | 2004-035925 A | 2/2004 |
| JP | 2006-183133 A | 7/2006 |
| JP | 2007-119884 A | 5/2007 |
| JP | 2008-056962 A | 3/2008 |
| JP | 2008-121036 A | 5/2008 |
| JP | 2009-052137 A | 3/2009 |
| JP | 2009051237 | 3/2009 |
| JP | 2009091653 | 4/2009 |
| JP | 2009-221534 A | 10/2009 |
| WO | WO2009/061006 A1 | 5/2009 |

OTHER PUBLICATIONS

Machine-English translation of Japanese patent No. 2009-091653, Shimamura Junji et al., Apr. 30, 2009.*
Supplemental European Search Report dated Mar. 19, 2013, application No. EP10833422.
International Search Report dated Mar. 8, 2011, application No. PCT/JP2010/071528.
Entire patent prosecution history of U.S. Appl. No. 13/511,790, filed, Aug. 20, 2012, entitled, "Welded Steel Pipe for Linepipe Having High Compressive Strength and Excellent Sour Gas Resistance and Manufacturing Method Thereof."
International Search Report dated Mar. 8, 2011, application No. PCT/JP2010/071536.
Supplementary European Search Report dated Mar. 13, 2013 (communication on Apr. 5, 2013), application No. EP 10833425.
Entire patent prosecution history of U.S. Appl. No. 13/511,822, filed, Aug. 10, 2012, entitled, "Welded Steel Pipe for Linepipe Having High Compressive Strength and High Fracture Toughness and Manufacturing Method Thereof."
International Search Report dated Mar. 8, 2011, application No. PCT/JP2010/071527.
Supplementary European Search report dated Mar. 26, 2013, application No. EP10833421.
Final Office Action mailed May 18, 2015 in U.S. Appl. No. 13/511,822.

* cited by examiner

WELDED STEEL PIPE FOR LINEPIPE WITH HIGH COMPRESSIVE STRENGTH AND MANUFACTURING METHOD THEREOF

CROSS-REFERENCE TO RELATED APPLICATIONS

This application is the U.S. National Phase application of PCT/JP2010/071528, filed Nov. 25, 2010, and claims priority to Japanese Patent Application No. 2009-267257, filed Nov. 25, 2009, the disclosures of which PCT and priority applications are incorporated herein by reference in their entireties for all purposes.

FIELD OF THE INVENTION

The present invention relates to a linepipe for transporting crude oil, a natural gas or the like, and more particularly to a welded steel pipe for a pipe with high compressive strength or a welded steel pipe for a pipe having still higher compressive strength and excellent sour gas resistance suitably used as a linepipe for deep-sea having a heavy wall thickness which is required to exhibit high collapse resistant performance, and a manufacturing method thereof. The compressive strength used in the present invention means, unless otherwise specified, compressive yield strength or 0.5% compressive proof strength. Also, the tensile yield strength means, unless otherwise specified, tensile yield strength or 0.5% tensile proof strength, wherein tensile strength means maximum stress obtained in a tensile test as usually defined.

BACKGROUND OF THE INVENTION

Along with the increase in demand for energy in recent years, the development of pipelines for crude oil or a natural gas has been promoted, and various pipelines which are constructed in oceans have been also developed to cope with a situation where gas fields or oil fields are located at remoter places or versatility in transport routes. To prevent a linepipe used for an offshore pipeline from collapsing due to water pressure, the linepipe for an offshore pipeline is formed of a linepipe having a wall thickness larger than a wall thickness of a linepipe for an onshore pipeline. Further, the linepipe used for an offshore pipeline is required to exhibit high roundness. With respect to material quality of the linepipe, the linepipe is required to possess high compressive strength to cope with compression stress generated in the circumferential direction of the pipe by external pressure.

It is often the case where the DNV standard (Det Norske Veritas standard) (OS F-101) is adopted in designing offshore pipelines. In this standard, collapse pressure is obtained using, as factors for deciding collapse pressure due to external pressure, a pipe diameter D, a wall thickness t, the roundness $f_0$) of a pipe and tensile yield strength fy of a material. However, the compressive strength changes depending on a manufacturing method of pipes even when pipes have the same size and the same tensile strength and hence, tensile yield strength is multiplied by a coefficient (afab) which differs depending on the manufacturing method. In the case of a seamless pipe, tensile yield strength of 1.0 can be directly applied as the DNV standard coefficient. However, in the case of a pipe manufactured by a UOE forming process, 0.85 is given as the coefficient. This is because, in the case of a pipe manufactured by a UOE forming process, compressive strength becomes lower than tensile yield strength. To consider a factor which causes such lowering of compressive strength, a UOE steel pipe is subjected to a pipe expanding process in a final step of pipe making so that the UOE steel pipe receives compression after tensile deformation is imparted to the pipe in the circumferential direction of the pipe whereby the compressive strength is lowered by a Bauschinger effect. Accordingly, it is necessary to increase compressive strength of the pipe for increasing collapse resistant performance. However, in the case of a steel pipe which is manufactured through a pipe expanding process in cold forming, there exists a drawback that compressive yield strength is lowered by a Bauschinger effect.

Many studies have been made with respect to the enhancement of collapse resistant performance of a UOE steel pipe, and patent document 1 discloses a method where a steel pipe is heated by Joule heating and, after the steel pipe is expanded, a temperature is held for a fixed time or more. According to this method, dislocation brought about by the pipe expansion is eliminated or dispersed and hence, the steel pipe can acquire a high yield point. However, it is necessary to continue Joule heating for holding the temperature for 5 minutes or more after the pipe expansion and hence, productivity is deteriorated.

Further, in the same manner as patent document 1, as a method of recovering compressive yield strength lowered by a Bauschinger effect by heating the steel pipe after pipe expansion, patent document 2 proposes a method where an outer surface of a steel pipe is heated at a temperature higher than a temperature of an inner surface of the steel pipe so that compressive yield strength on an inner surface side increased by strain hardening is maintained, and compressive yield strength on an outer surface side lowered by a Bauschinger effect is increased.

Further, patent document 3 proposes a method where accelerated cooling after hot rolling is performed from an $Ar_3$ temperature or above to 300° C. or below in a process of manufacturing a steel plate made of Nb-Ti added steel, a steel pipe is made from the steel plate by a UOE forming process and, thereafter, the steel pipe is heated at a temperature of 80 to 550° C.

However, with respect to the method disclosed in patent document 2, it is extremely difficult to separately control the heating temperature and the heating time of the outer surface and the inner surface of the steel pipe in terms of the actual manufacture of a steel pipe, and particularly to control quality of the steel pipe in a mass production process is extremely difficult. The method disclosed in patent document 3 also has a drawback that it is necessary to set a stop temperature of accelerated cooling in the manufacture of the steel plate at the low temperature of 300° C. or below and hence, the distortion of the steel plate is increased whereby when a steel pipe is made from the steel plate by a UOE forming process, the roundness of the steel pipe is lowered. The method disclosed in patent document 3 also has a drawback that since the accelerated cooling is performed from the $Ar_3$ temperature or above, it is necessary to perform rolling at a relatively high temperature so that the fracture toughness is deteriorated.

On the other hand, as a method of increasing compressive strength by a steel pipe forming method without performing heating after pipe expansion, patent document 4 discloses a method where a compression rate at the time of O shape forming is set larger than an expansion rate in the pipe expansion performed after the O shape forming. According to the method disclosed in patent document 4, there is substantially no tensile pre-strain in the circumferential direction of a steel pipe and hence, a Bauschinger effect does not occur whereby the steel pipe can acquire high compressive strength. However, when the expansion rate is low, it becomes difficult for the steel pipe to maintain roundness thus giving rise to a possibility that collapse resistant performance of the steel pipe is deteriorated.

Patent document 5 discloses a method where collapse resistant performance is enhanced by making a diameter of a steel pipe where a seam weld and an axially symmetric part of the seam weld (a position 180° away from the seam weld, and a portion where compressive strength on an outer surface side is low) are set as end points become the maximum diameter of the steel pipe. However, a portion of the steel pipe which may cause a problem on collapse in the actual pipeline construction is a portion of the steel pipe which reaches a sea bed and is subjected to bending deformation (sag-bend portion), and the pipeline is constructed on the sea bed by girth weld irrelevant to the position of the seam weld of the steel pipe. Accordingly, even when the end points of the seam weld are set on a major axis, the method does not exhibit any practical effects.

Further, patent document 6 proposes a steel plate where reheating is performed after accelerated cooling so that a fraction of a hard second phase on a steel plate surface layer portion is decreased, and the difference in hardness between a surface layer portion and the plate thickness center portion is made small and hence, the uniform strength distribution in the plate thickness direction is acquired whereby lowering of yield stress caused by a Bauschinger effect can be made small.

Further, patent document 7 proposes a manufacturing method of a steel plate for a linepipe having high strength and sour gas resistance with a plate thickness of 30 mm or more, wherein in reheating treatment after accelerated cooling, a steel plate surface layer portion is heated while suppressing the elevation of a temperature of a steel plate center portion. Due to such a manufacturing method, a fraction of a hard second phase of a steel plate surface layer portion can be decreased while suppressing lowering of DWTT property (Drop Weight Tear Test property) and hence, a steel plate where hardness of the steel plate surface layer portion is decreased and has small irregularities in material quality is acquired, and also the reduction of a Bauschinger effect due to the decrease of the fraction of the hard second phase can be also expected.

However, in manufacturing the steel plate disclosed in patent document 6, it is necessary to perform heating such that heating reaches a center portion of the steel plate at the time of heating thus causing lowering of DWTT property. Accordingly, the application of the technique to a linepipe having a heavy wall thickness for deep sea has been difficult.

Further, a Bauschinger effect is influenced by various microstructure factors such as a grain size or an amount of solid solution carbon and hence, as in the case of a technique described in patent document 7, a steel pipe with high compressive strength cannot be acquired with the mere reduction of a hard second phase. Further, under the reheating condition disclosed in patent document 7, it is difficult for the steel pipe to acquire a balance among excellent tensile strength, excellent compressive strength and excellent DWTT property due to a tendency that grains of cementite becomes coarse through the coagulation, the precipitation of a carbide forming element such as Nb or C and the lowering of solid solution C caused by the coarse cementite grains and the precipitation of the carbide forming element.

Patent Documents:
  Patent Document 1: JP-A-9-49025
  Patent Document 2: JP-A-2003-342639
  Patent Document 3: JP-A-2004-35925
  Patent Document 4: JP-A-2002-102931
  Patent Document 5: JP-A-2003-340519
  Patent Document 6: JP-A-2008-56962
  Patent Document 7: JP-A-2009-52137

SUMMARY OF THE INVENTION

Embodiments of the present invention have been made under the above-mentioned circumstances, and it is an object of the present invention to provide a welded steel pipe for a linepipe having high strength and excellent fracture toughness necessary for the application of the steel pipe to an offshore pipeline having a heavy wall thickness, that is, a welded steel pipe for a linepipe with high compressive strength and a heavy wall thickness which can suppress lowering of compressive strength caused by a Bauschinger effect and can exhibit excellent sour resistance performance by optimizing the metal microstructure of a steel plate without requiring particular forming conditions in forming the steel pipe and without requiring heat treatment after pipe making.

The inventors of the present invention have carried out various experiments to achieve a steel pipe which satisfies both the enhancement of compressive strength which is suppressed by a Bauschinger effect and the acquisition of strength and fracture toughness, and have made the following findings.

(1) Lowering of tensile strength and compressive strength caused by a Bauschinger effect is caused by the generation of back stress due to the integration of dislocation in an interface between different phases or in a hard second phase. To prevent the lowering of tensile strength and compressive strength caused by a Bauschinger effect, firstly, it is effective to decrease a hard second phase such as M-A constituent (hereinafter also referred to as "MA") which is a place where dislocation is integrated. For this end, lowering of compressive strength caused by a Bauschinger effect can be suppressed by decreasing a fraction of the hard MA to a fixed amount or less.

(2) High-strength steel manufactured by accelerated cooling, particularly a steel plate having a heavy wall thickness used for an offshore pipeline contains a large amount of alloy elements for acquiring required strength so that the steel plate has high hardenability whereby it is difficult to completely suppress the formation of MA. However, by making the bainite microstructure fine and by finely dispersing formed MA, a Bauschinger effect due to the second phase can be suppressed. Further, coarse and elongated MA is liable to generate strain concentration during deformation and hence, by setting a maximum diameter and an aspect ratio of MA to fixed values or less respectively, a Bauschinger effect can be further suppressed.

(3) A shape of MA can be controlled in accordance with a hot rolling condition and an accelerated cooling condition at the time of manufacturing a steel plate. MA which is formed as the second phase can be finely dispersed by making the structure fine with rolling of a fixed amount or more in a non-recrystallized region. The formation of the elongated MA can be suppressed by controlling an acceleration cooling stop temperature at a fixed temperature or more. Further, when MA is formed due to lowering of the acceleration cooling stop temperature, MA can be decomposed to cementite by reheating performed thereafter and hence, a Bauschinger effect due to the second phase can be decreased.

(4) When the metal microstructure contains a soft ferrite phase, aback stress attributed to the integration of dislocation on an interface between the ferrite phase and the bainite phase is generated thus giving rise to lowering of a compressive strength caused by a Bauschinger effect. In this case, by setting a fraction of ferrite to a fixed value or less, by decreasing a fraction of MA which more adversely affects the compressive strength and by properly controlling a shape of ferrite, the influence on lowering of compressive stress exerted by ferrite can be decreased. However, when a ferrite phase is formed into rolled ferrite by being subjected to rolling, the mobile dislocation is increased so that the integration of dislocation on a ferrite/bainite interface is also increased whereby lowering of compressive strength caused by back stress is accelerated.

(5) By properly setting the C content and an addition content of carbide formation elements such as Nb in the steel material thus sufficiently ensuring solid solution C (solid solution carbon), an interaction between dislocation and solid solution C is generated whereby the movement of dislocation at the time of inversion of a load is impeded so that lowering of strength due to back stress can be suppressed.

(6) By putting proper amounts of Cu and Ca into steel, sour resistance performance can be imparted to steel. In a solution containing hydrogen sulfide, Cu forms a film on a surface thereof thus suppresses the intrusion of hydrogen. Further, Ca and S form inclusion so that the formation of MnS which is liable to become a starting point of hydrogen induced cracking can be suppressed.

Embodiments of the present invention have been made based on the above-mentioned findings and include the following first to fifth embodiments.

The first embodiment is directed to a welded steel pipe for a linepipe with excellently high compressive strength having the composition which contains by mass % 0.03 to 0.10% C, 0.30% or less Si, 1.00 to 2.00% Mn, 0.015% or less P, 0.003% or less S, 0.080% or less Al, 0.005 to 0.035% Nb, 0.005 to 0.020% Ti, and Fe and unavoidable impurities as a balance, wherein C(%)—0.065Nb(%) is 0.025 or more, and a Ceq value expressed by a following formula is 0.3 or more, and the steel pipe has metal microstructure where an area fraction of bainite is 60% or more, an area fraction of rolled ferrite is 5% or less, an area fraction of M-A constituent (MA) is 3% or less, an average grain size of MA is 2 μm or less, and an aspect ratio of MA is 5 or less.

Ceq=C(%)+Mn(%)/6+{Cr(%)+Mo(%)+V(%)}/54-{Cu(%)+Ni(%)}/15

In the above-mentioned formula, with respect to the element whose content is at an unavoidable impurity level (element not added), the calculation is made by setting the content of the element to 0%.

The second embodiment is directed to the above-mentioned welded steel pipe for a linepipe with excellently high compressive strength according to the first embodiment, wherein the composition further contains by mass % one or more kinds selected from a group consisting of 0.5% or less Cu, 1% or less Ni, 0.5% or less Cr, 0.5% or less Mo and 0.1% or less V, and C(%)—0.065Nb(%)—0.025Mo(%)—0.057V(%) is 0.025 or more. In the above-mentioned formula, with respect to the element whose content is at an unavoidable impurity level (element not added), the calculation is made by setting the content of the element to 0%.

The third embodiment is directed to the above-mentioned welded steel pipe for a linepipe with excellently high compressive strength having sour resistance performance according to the first embodiment, wherein the composition further contains by mass % one or more kinds selected from a group consisting of 0.20 to 0.40% Cu, 0.05 to 1.00% Ni, 0.0005 to 0.0035% Ca, 0.50% or less Cr, 0.50% or less Mo and 0.10% or less V, and C(%)—0.065Nb(%)—0.025Mo(%)—0.057V(%) is 0.025 or more. In the above-mentioned formula, with respect to the element whose content is at an unavoidable impurity level (element not added), the calculation is made by setting the content of the element to 0%.

The fourth embodiment is directed to a method of manufacturing the welded steel pipe for a linepipe with excellently high compressive strength according to any one of the first to third embodiments, wherein a steel plate is heated to a temperature which falls within a range of 1000 to 1200° C., is subjected to hot rolling where a rolling reduction rate in a non-recrystallization temperature range is set to 60% or more and a rolling completion temperature is $Ar_3$ or above and, subsequently, is subjected to accelerated cooling at a cooling rate of 10° C./sec or more from a temperature of ($Ar_3$−30° C.) or above until a steel plate surface temperature falls within a range of 350 to 550° C. thus manufacturing a steel plate, the steel plate is formed into a steel pipe shape by cold forming, welding is applied to seams of the steel pipe, and the steel pipe is subjected to pipe expansion with an expansion rate of 0.4 to 1.20.

The fifth embodiment is directed to a method of manufacturing the welded steel pipe for a linepipe with excellently high compressive strength according to any one of the first to third embodiments, wherein a steel plate is heated to a temperature which falls within a range of 1000 to 1200° C., is subjected to hot rolling where a rolling reduction rate in a non-recrystallization temperature range is set to 600 or more and a rolling completion temperature is $Ar_3$ or above and, subsequently, is subjected to accelerated cooling at a cooling rate of 10° C./sec or more from a temperature of ($Ar_3$−30° C.) or above until a steel plate surface temperature falls within a range of 250 to 550° C. and, subsequently, is subjected to reheating such that a steel plate surface temperature falls within a range of 550 to 720° C., and a steel plate center temperature becomes below 550° C. thus manufacturing a steel plate, the steel plate is formed into a steel pipe shape by cold forming, welding is applied to seams of the steel pipe, and the steel pipe is subjected to pipe expansion with an expansion rate of 0.4 to 1.2%.

According to embodiments of the present invention, it is possible to acquire a welded steel pipe for a linepipe having high strength and excellent fracture toughness necessary for the application of the steel pipe to an offshore pipeline, and also with high compressive strength.

DETAILED DESCRIPTION OF THE INVENTION

Preferred modes for carrying out the present invention are explained hereinafter. Firstly, reasons for limiting the respective constitutional elements of embodiments of the present invention are explained.

1. Chemical Composition

Firstly, the reason that chemical components contained in a welded steel pipe with high compressive strength and excellent sour gas resistance according to embodiments of the present invention are limited is explained. In all components, component % means mass %. In embodiments of the present invention, a numerical value of a next digit within a numerical value range of each chemical composition or the like defined hereinafter is 0. For example, 0.02 to 0.06% C means 0.020 to 0.060% C, and 0.01 to 0.5% Si means 0.010 to 0.50% Si. Further, also with respect to a grain size, 5μm or less means 5.0 μm or less. Further, a fraction of MA or the like of 2% or less means a fraction of MA or the like of 2.0% or less.

C: 0.03 to 0.10%

C is the most effective element for increasing strength of a steel plate which is manufactured by accelerated cooling. However, when the content of C is less than 0.03%, the steel plate cannot ensure sufficient strength, while when the content of C exceeds 0.10%, not only the fracture toughness is deteriorated but also the generation of MA is accelerated thus causing the lowering of compression strength. Accordingly, the content of C is set to a value which falls within a range of 0.03 to 0.10%. To acquire higher fracture toughness and higher compression strength, the content of C is preferably set to a value which falls within a range of 0.03 to 0.080%.

Si: 0.30% or Less

Si is added to the steel for deoxidizing. Such an effect can be acquired when the content of Si is 0.01% or more. On the other hand, when the content of Si exceeds 0.30%, the fracture toughness of the base material and weldability of steel are deteriorated, and the generation of MA of a base material is also accelerated. Accordingly, the content of Si is set to 0.30% or less. Further, Si is an element which conspicuously accelerates the generation of MA in the HAZ microstructure such as a CGHAZ (Coarse grain heat affected zone) or an ICCG-HAZ (Inter-Critical CGHAZ) and hence, it is preferable to set the content of Si as small as possible from viewpoint of ensuring the HAZ fracture toughness. MA in the HAZ microstructure is influenced by various elements having hardening property besides Si and, in general, the higher the strength which a base material intends to acquire, the larger an addition amount of the element having hardening property becomes so that an amount of MA is increased. Accordingly, from a viewpoint of acquiring the HAZ fracture toughness, it is desirable to set the content of Si smaller corresponding to the increase of the strength of the base material. That is, it is desirable to set the content of Si to 0.15% or less in case of the base material having strength of X65 (API 5L X65 which corresponds to tensile yield strength of 450 MPa), and it is desirable to set the content of Si to 0.09% or less in case of the base material having strength of X70 (API 5L X70 which corresponds to tensile yield strength of 480 MPa). Accordingly, the content of Si is preferably set to 0.15% or less. The content of Si is more preferably set to a value which falls within a range of 0.01 to 0.09%.

Mn: 1.00 to 2.00%

Mn is added to the steel for enhancing strength and fracture toughness of steel. When the content of Mn is less than 1.00%, effects are not sufficient, while when the content of Mn exceeds 2.00%, the fracture toughness and the HIC resistance of a weld are deteriorated. Accordingly, the content of Mn is set to a value which falls within a range of 1.00 to 2.00%. The content of Mn is more preferably set to a value which falls within a range of 1.30 to 2.00%. On the other hand, Mn has an effect of improving the fracture toughness by suppressing the formation of grain boundary ferrite in the HAZ microstructure and hence, to ensure HAZ fracture toughness, it is desirable to set the content of Mn to be added to 1.5% or more. It is more preferable to set the content of Mn to be added to a value which falls within a range of 1.50 or more to 2.00%.

P: 0.015% or Less

P is an unavoidable impurity and deteriorates the fracture toughness of a steel material. Particularly, P increases hardness of a welded heat affected zone so that the fracture toughness of the welded heat affected zone is conspicuously deteriorated. Accordingly, the content of P is set to 0.015% or less. The content of P is preferably set to 0.008% or less.

S: 0.003% or Less

S constitutes an MnS-based inclusion in steel, and acts as a starting point of the occurrence of a void at the time of impact rupture and hence, S becomes a cause of lowering absorbed energy in a Charpy impact test. Accordingly, the content of S is set to 0.003% or less. When the steel is required to exhibit the higher energy absorption, it is effective to further lower the content of S, and the content of S is preferably set to 0.0015% or less.

Al: 0.080% or Less

Al is added to the steel as a deoxidizer. The steel can acquire such an effect when the content of Al is 0.01% or more. However, when the content of Al exceeds 0.080%, cleanability is lowered thus deteriorating ductility. Accordingly, the content of Al is set to 0.080% or less. The content of Al is more preferably set to a value which falls within a range of 0.010 to 0.040%.

Nb: 0.005 to 0.035%

Nb enhances the fracture toughness by making the microstructure of steel fine by suppressing a grain growth at the time of rolling. However, when the content of Nb is less than 0.005%, steel cannot acquire this effect. On the other hand, when the content of Nb exceeds 0.035%, Nb precipitates in the form of carbide and hence, the content of solid solution C is lowered whereby a Bauschinger effect is accelerated so that high compressive strength cannot be acquired and, further, the fracture toughness of the welded heat affected zone is lowered. Accordingly, the content of Nb is set to a value which falls within a range of 0.005 to 0.035%. Further, although Nb is temporarily brought into solid solution at the time of reheating a slab and exhibits its ability, the larger the content of Nb, the higher a slab heating temperature necessary for bringing Nb into solid solution becomes. On the other hand, it is preferable to set the slab heating temperature as low as possible to ensure the DWTT performance and hence, within a range of slab heating temperature where DWTT performance can be ensured, Nb cannot sufficiently exhibit the slab heating temperature lowering effect even when the addition content of Nb exceeds 0.030%. Accordingly, the content of Nb is more preferably set to a value which falls within a range of 0.005 to 0.030%.

Ti: 0.005 to 0.020%

Ti forms TiN and suppresses the grain growth at the time of heating a slab and also suppresses a grain growth of a welded heat affected zone thus enhancing the fracture toughness by making the microstructure of a base material and the welded heat affected zone fine. However, when the content of Ti is less than 0.005%, such effects cannot be acquired, while when the content of Ti exceeds 0.020%, the fracture toughness is deteriorated. Accordingly, the content of Ti is set to a value which falls within a range of 0.005 to 0.020%.

C(%)-0.065Nb(%): 0.025 or More

The present invention aims at the enhancement of compressive strength of a steel pipe by reducing a Bauschinger effect through the suppression of the generation of back stress by making use of an interaction between solid solution C and dislocation and hence, it is important for the steel pipe to ensure effective solid solution C. In general, C in steel precipitates in the form of cementite or MA, and also is bonded with a carbide forming element such as Nb and precipitates in the form of carbide thus reducing an amount of solid solution C. Here, when the content of Nb is excessively large relative to the content of C, a precipitation amount of Nb carbide becomes large and hence, a sufficient amount of solid solution C cannot be obtained.

However, when C(%)-0.065Nb(%) is 0.025 or more, a sufficient amount of solid solution C can be obtained. Accordingly, C(%)-0.065Nb(%) which is the relationship formula between the content of C and the content of Nb is set to 0.025 or more. C(%)-0.065Nb(%) is more preferably set to 0.028 or more.

CM-0.065Nb(%)-0.025Mo(%)-0.057V(%): 0.025 or More

Mo and V which are selective elements of embodiments of the present invention are elements which form carbide in the same manner as Nb and hence, when these elements are added, it is also preferable to add these elements to the steel within ranges where a sufficient amount of solid solution C can be obtained. However, when a value of the relational formula expressed by C(%)-0.065Nb(%)-0.025Mo(%)-0.057V(%) is less than 0.025, an amount of solid solution C becomes short and hence, C(%)-0.065Nb(%)-0.025Mo(%)-0.057V(%) is set to 0.025 or more. C(%)-0.065Nb(%)-0.025Mo(%)-0.057V(%) is more preferably set to 0.028 or more. With respect to the element whose content is at an unavoidable impurity level (element not added), the calculation is made by setting the content of the element to 0%.

In embodiments of the present invention, in addition to the above-mentioned chemical compositions, the following elements can be further desirably added as selective elements.

Cu: 0.50% or Less

Cu is an element effective for improving the fracture toughness and for increasing strength. Such an effect can be acquired when the content of Cu to be added is 0.10% or more. However, when the content of Cu to be added exceeds 0.50%, the fracture toughness of the weld is deteriorated. Accordingly, when Cu is added to steel, the content of Cu to be added is set to 0.50% or less.

Further, when steel is exposed to a solution containing hydrogen sulfide, hydrogen atoms invades the steel from a surface of the steel and a hydrogen gas is generated inside the steel, and hydrogen induced cracking occurs due to an internal pressure of the hydrogen gas. By allowing steel to contain Cu, a Cu film is formed on a surface of steel in a solution containing hydrogen sulfide so that a hydrogen invasion amount can be reduced whereby sour resistance performance can be enhanced. This effect is acquired when the content of Cu is 0.20% or more. On the other hand, even when the content of Cu exceeds 0.40%, this effect is saturated. Accordingly, when it is preferable to acquire the further sour resistance performance effect, the content of Cu is set to a value which falls within a range of 0.20 to 0.40%.

Ni: 1.00% or Less

Ni is an element effective for improving the fracture toughness and for increasing strength. Such effect can be acquired when the content of Ni to be added is 0.10% or more. However, when the content of Ni to be added exceeds 1.00%, the fracture toughness of the weld is deteriorated. Accordingly, when Ni is added to the steel, the content of Ni to be added is set to 1.00% or less.

Further, when Cu is added to the steel, it is effective to add Ni together with Cu for preventing cracking by heating. It is necessary to set the content of Ni to at least 0.05% to suppress such cracking. Accordingly, when the prevention of cracking by heating is particularly necessary, it is preferable to set the content of Ni to a value which falls within a range of 0.05 to 1.00%. It is more preferable to set the content of Ni to 0.80% or less.

Cr: 0.50% or Less

Cr is an element effective for increasing strength by increasing hardenability. Such effect can be acquired when the content of Cr to be added is 0.10% or more. However, when the content of Cr to be added exceeds 0.50%, the fracture toughness of the weld is deteriorated. Accordingly, when Cr is added to the steel, the content of Cr to be added is set to 0.50% or less. The content of Cr to be added is more preferably set to 0.30% or less.

Mo: 0.50% or Less

Mo is an element effective for improving the fracture toughness and for increasing strength. Such effect can be acquired when the content of Mo to be added is 0.05% or more. However, when the content of Mo to be added exceeds 0.50%, the fracture toughness of the weld is deteriorated. Accordingly, when Mo is added to the steel, the content of Mo to be added is set to 0.50% or less. The content of Mo to be added is more preferably set to 0.30% or less.

V: 0.10% or Less

V is an element which increases strength without deteriorating the fracture toughness. Such effect can be acquired when the content of V to be added is 0.010% or more. However, when the content of V to be added exceeds 0.10%, in the same manner as Nb, V precipitates as carbide thus decreasing solid solution C. Accordingly, when V is added to the steel, the content of V to be added is set to 0.10% or less. The content of V to be added is more preferably set to 0.060% or less.

Ca: 0.0005 to 0.0035%

Ca is an element effective for enhancing ductility by controlling the configuration of a sulfide-based inclusion and is also an element effective for enhancing sour resistance performance. However, when the content of Ca to be added is less than 0.0005%, such an effect cannot be acquired. On the other hand, even when the content of Ca to be added exceeds 0.0035%, the effect is saturated and, rather, the fracture toughness is deteriorated due to lowering of cleanability. Accordingly, the content of Ca to be added is set to a value which falls within a range of 0.0005 to 0.0035%. The content of Ca to be added is more preferably set to a value which falls within a range of 0.0015 to 0.0035%.

Ceq Value: 0.3 or More $$Ceq=C(\%)+Mn(\%)/6+\{Cr(\%)+Mo(\%)+V(\%)\}/5+\{Cu(\%)+Ni(\%)\}/15$$

Ceq is a hardenability index of steel. The higher the Ceq value, the higher the tensile strength and the compressive strength of a steel material become. When the Ceq value is less than 0.3, a steel pipe having a heavy wall thickness exceeding 20 mm cannot ensure sufficient strength and hence, the Ceq value is set to 0.3 or more. Further, to ensure sufficient strength with respect to a steel pipe having a heavy wall thickness exceeding 30 mm, the Ceq value is desirably set to 0.36 or more. The higher the Ceq value, the low-temperature crack sensitivity is increased thus promoting weld cracks. Accordingly, to allow welding of a steel material without preheating even under a severe environment such as an environment on a pipeline construction ship, an upper limit of the Ceq value is set to 0.42.

With respect to the element whose content is at an unavoidable impurity level (element not added), the calculation is made by setting the content of the element to 0%.

A balance of steel of embodiments of the present invention is substantially constituted of Fe, and the steel may contain elements and unavoidable impurities other than the above-mentioned elements provided that these elements and impurities do not impair the advantageous effects of the present invention. Although N which is contained as the unavoidable impurity is bonded with Ti and precipitates in steel in the form of TiN, N contributes to the prevention of the structure of the welded heat affected zone from becoming coarse at the time of slab heating due to a pinning effect and hence, when the high fracture toughness is particularly required in the welded heat affected zone, it is preferable to set the content of N to a value which falls within a range of 0020 to 0.0060%.

2. Metal Microstructure

Reasons for limiting metal microstructure in embodiments of the present invention are explained hereinafter. Hereinafter, all fractions of metal microstructure and MA mean area fractions. The metal microstructure can be specified in such a manner that a specimen is sampled from a position of ¼ of a plate thickness on an inner surface side of a steel pipe, the specimen was etched using nital after polishing, and each metal microstructure was observed using an optical microscope. Then, using three to five photographs taken at magnification of 200 times, area fractions of the respective metal microstructures such as bainite, ferrite and rolled ferrite can be obtained by an image analysis.

Area Fraction of Bainite: 60% or More

To acquire high compressive strength by suppressing a Bauschinger effect, it is preferable to form the metal microstructure into the uniform microstructure having a small amount of soft ferrite phase and a small amount of hard second phase thus suppressing the integration of local dislocation generated in the inside of the microstructure at the time of deformation. Accordingly, the metal microstructure is mainly formed of bainite. To acquire such an effect, it is preferable to set a fraction of bainite to 60% or more. Further, when high compressive strength is required, it is desirable to set the fraction of bainite to 80% or more.

Area Fraction of Rolled Ferrite: 5% or Less

When a ferrite phase is turned into rolled ferrite by being subjected to rolling, mobile dislocation is increased so that integration of dislocation on a ferrite/bainite interface is also increased whereby lowering of compressive strength attributed to back stress is accelerated. However, when the area fraction of rolled ferrite is 5% or less, the influence of the rolled ferrite is small and hence, lowering of compressive strength does not occur. Accordingly, the area fraction of rolled ferrite is set to 5% or less. The ferrite phase and the rolled ferrite can be distinguished from each other by the observation of microstructure. For example, as described later, the area fraction can be acquired by treating grains where a deformation band is observed in ferrite grains as rolled ferrite.

Area Fraction of M-A Constituent (MA): 3% or Less

M-A constituent (MA) is an extremely hard phase, and accelerates the integration of local dislocation at the time of deformation and brings about lowering of compressive strength caused by a Bauschinger effect whereby it is preferable to strictly limit a fraction of M-A constituent. However, when the fraction of MA is 3% or less, the influence exerted by M-A constituent is small and hence, lowering of compressive strength does not occur. Accordingly, the fraction of M-A constituent (MA) is set to 3% or less. An area fraction of MA can be obtained in such a manner that, after etching the specimen using nital, electrolytic etching (two-step etching) is applied to the specimen and, thereafter, the microstructure is observed using a scanning electron microscope (SEM).

Average Grain Size of MA: 2 μm or Less

Although MA accelerates the integration of local dislocations at the time of deformation as described above, the larger the size of MA, the more local strain concentration is accelerated and a larger back stress is generated thus lowering compressive strength of steel. However, when an average grain size of MA is 2 μm or less, the local strain concentration is dispersed and hence, a strain concentration amount is also decreased whereby the generation of a Bauschinger effect can be further suppressed. Accordingly, an average grain size of MA is set to 2 μm or less. An average grain size of MA is preferably set to 1 μm or less. Here, the average grain size is a circle equivalent diameter obtained by an image analysis.

Aspect Ratio of MA: 5 or Less

When MA has an elongated shape with a large aspect ratio, local strain concentration is induced in a tip end portion of MA so that compressive strength of MA is lowered. However, when the aspect ratio of MA is 5 or less, the influence exerted on compressive strength by the aspect ratio is small and hence, the aspect ratio of MA is set to 5 or less. An average grain size and an aspect ratio are obtained together with an area fraction of MA from a photograph taken with magnification of 1000 times by an image analysis. The aspect ratio is an average value of values acquired by dividing long sides (or longest portions) of individual MA by largest sides (or longest portions) in the direction which intersects the long sides at an angle of 90°. To set the aspect ratio of MA to 5 or less, it is preferable to limit the above-mentioned chemical composition and manufacture conditions described later. Particularly, with respect to the chemical composition, it is preferable to limit the contents of C and Si which have a function of accelerating the generation of MA, while with respect to a manufacturing condition, it is preferable to control an operation of making the microstructure fine by rolling reduction in a non-recrystallized region and a lower limit of acceleration cooling stop temperature.

The steel pipe of embodiments of the present invention can acquire high compressive strength since the metal microstructure has the above-mentioned features. On the other hand, the steel pipe of embodiments of the present invention can contain, besides the above-mentioned microstructure, the microstructures such as cementite, pearlite and martensite provided that the total of fractions of these microstructures is set to 5% or less. This is because the steel pipe is not adversely affected by such an amount of microstructures.

In general, the metal microstructure of a steel plate manufactured by applying accelerated cooling may differ in the plate thickness direction of the steel plate. The collapse of a steel pipe which receives an external pressure occurs in such a manner that the plastic deformation of a steel-pipe inner surface side of the steel pipe having a smaller circumferential length is generated firstly and hence, an inner-surface-side property of the steel pipe becomes important with respect to compression strength. Accordingly, in general, a compressive test specimen is sampled from an inner surface side of the steel pipe.

3. Manufacturing Conditions

According to the present invention, the fourth embodiment is directed to a manufacturing method where the steel slab containing the above-mentioned chemical composition is heated, is subjected to hot rolling and, thereafter, is subjected to accelerated cooling. Hereinafter, reasons for limiting manufacturing conditions of a steel plate are explained. Here, following temperatures mean surface temperatures of steel plates unless otherwise specified.

Slab Heating Temperature: 1000 to 1200° C.

When a slab heating temperature is below 1000° C., sufficient tensile strength and sufficient compressive strength cannot be acquired, while when the slab heating temperature exceeds 1200° C., the fracture toughness and DWTT property are deteriorated. Accordingly, the slab heating temperature is set to a value which falls within a range of 1000 to 1200° C.

When further excellent DWTT property is required, an upper limit of the slab heating temperature is desirably set to 1100° C.

Rolling Reduction Rate in Non-Recrystallization Temperature Range: 60% or More

To acquire the fine bainite microstructure which can decrease a Bauschinger effect and high base-material fracture toughness, it is preferable to perform sufficient rolling reduction in a non-recrystallization temperature range in a hot rolling step. Further, the microstructure is made fine by rolling and hence, MA which is generated as a second phase can be finely dispersed. However, the effect is insufficient when a rolling reduction rate is less than 60% and hence, the rolling reduction rate in the non-recrystallization temperature range is set to 60% or more. Here, when rolling is performed through a plurality of rolling passes, a cumulative rolling reduction rate is used as the rolling reduction rate. Further, although the non-recrystallization temperature range changes depending on an alloy element such as Nb or Ti, with the addition amounts of Nb and Ti according to embodiments of the present invention, the non-recrystallization temperature range may be set to 950° C. or below.

Rolling Completion Temperature: $Ar_3$ or Above

To suppress lowering of strength caused by a Bauschinger effect, it is preferable to form the metal microstructure into the microstructure where a fraction of bainite is 60% thus suppressing the excessive formation of a ferrite phase. Further, when the ferrite phase is formed into rolled ferrite by being subjected to rolling, the mobile dislocation is increased so that the generation of back stress caused by the integration of dislocation is accelerated leading to lowering of compressive strength. Accordingly, hot rolling is performed at an $Ar_3$ temperature which is a ferrite forming temperature or above. Although an upper limit of the rolling completion temperature is not specifically set, it is desirable to set the rolling completion temperature as low as possible for ensuring low-temperature fracture toughness such as DWTT performance. Accordingly, it is more preferable to set the rolling completion temperature to the $Ar_3$ temperature or above and 820° C. or below. It is more preferable to set the rolling completion temperature to the $Ar_3$ temperature or above and 800° C. or below.

The $Ar_3$ temperature changes depending on alloy components of steel and hence, the transformation temperature may be obtained by measurement by carrying out an experiment on respective steels. However, the transformation temperature may be also obtained based on contents using the following formula (1).

$$Ar_3(° C.)=910-310C(\%)-80Mn(\%)-20Cu(\%)-15Cr(\%)-55Ni(\%)-80Mo(\%) \quad (1)$$

With respect to an element whose content is at an unavoidable impurity level (element not added), the calculation is made by setting the content of the element to 0%.

Accelerated cooling is performed following hot rolling. Conditions of accelerated cooling are as follows. Cooling start temperature: ($Ar_3$–30° C.) or above Although the metal microstructure is formed into the microstructure mainly constituted of bainite by performing accelerated cooling after hot rolling, when a cooling start temperature becomes below an $Ar_3$ temperature which is a ferrite forming temperature, the metal microstructure becomes the mixed microstructure of ferrite and bainite and hence, lowering of strength caused by Bauschinger effect is large whereby compressive strength is lowered. However, when the accelerated cooling start temperature is ($Ar_3$–30° C.) or above, a fraction of ferrite is low so that lowering of strength caused by a Bauschinger effect is also small. Accordingly, the cooling start temperature is set to ($Ar_3$–30° C.) or above.

Cooling Rate: 10° C./Sec or More

Accelerated cooling is an important process for the acquisition of a steel plate having high strength and high fracture toughness, wherein by cooling the steel plate at a high cooling rate, the steel plate can acquire a strength increasing effect due to strengthening of transformation. However, when the cooling rate is less than 10° C./sec, not only the steel plate cannot acquire sufficient tensile strength and sufficient compressive strength but also the concentration of C occurs in non-transformed austenite due to the occurrence of diffusion of C and hence, a formation amount of MA becomes large. Since a Bauschinger effect is accelerated due to a hard second phase such as MA as described previously, compressive strength is lowered. However, when the cooling rate is 10° C./sec or more, the diffusion of C during cooling can be decreased so that the formation of MA can be also suppressed. Accordingly, a lower limit of the cooling rate at the time of accelerated cooling is set to 10° C./sec.

Cooling Stop Temperature: 350 to 550° C.

The bainite transformation progresses by accelerated cooling so that the steel plate can acquire required tensile strength and compressive strength. However, when a temperature at the time of stopping cooling exceeds 550° C., the bainite transformation is insufficient so that the steel plate cannot acquire sufficient tensile strength and compressive strength. Further, the bainite transformation is not completed and hence, the concentration of C occurs in the non-transformed austenite during air cooling after stopping cooling so that the formation of MA is accelerated. On the other hand, when a steel plate average temperature at the time of stopping cooling is below 350° C., not only the bainite transformation but also the martensite transformation are generated so that undesired elongated MA is generated and hence, such a temperature is not desirable. Accordingly, the temperature at the time of stopping cooling is set to a value which falls within a range of 350° C. to 550° C.

According to the present invention, the fifth embodiment is characterized by applying reheating treatment to the steel plate after accelerated cooling. Reasons for limiting the reheating conditions which are different conditions from the fourth embodiment are mainly explained hereinafter.

Steel Plate Surface Temperature: 550 to 720° C.

In accelerated cooling of a steel plate having a heavy wall thickness, a cooling rate of a steel plate surface layer portion is fast, and the surface layer portion is cooled to a temperature lower than a temperature of the inside of the steel plate. Accordingly, MA is liable to be formed in the steel plate surface layer portion. Such a hard phase accelerates a Bauschinger effect and hence, lowering of compressive strength caused by a Bauschinger effect can be suppressed by decomposing MA by heating the surface layer portion of the steel plate after accelerated cooling. However, the decomposition of MA is not sufficient when the surface temperature is below 550° C., while when the surface temperature exceeds 720° C., a heating temperature of a steel plate center portion is also elevated thus bringing about large lowering of strength. Accordingly, when reheating is performed aiming at the decomposition of MA after accelerated cooling, the steel plate surface temperature at the time of reheating is set to a value which falls within a range of 550 to 720° C.

The measurement of steel plate surface temperatures can be carried out using a known thermometer in accordance with a normal method.

Steel Plate Center Temperature: Below 550° C.

Due to reheating after accelerated cooling, MA in the surface layer portion is decomposed so that the steel plate can acquire high compressive strength. However, when a heating temperature of the steel plate center portion becomes 550° C. or above, a phenomenon that cementite coagulates and becomes coarse occurs and hence, DWTT property is deteriorated. Accordingly, the steel plate center temperature during reheating after accelerated cooling is set to a temperature below 550° C.

Here, a steel plate center temperature during reheating can be acquired by a heat conduction analysis based on a surface temperature. Although a temperature of a surface of a steel plate becomes higher than a temperature of the inside of the steel plate during heating, the temperature difference between a surface layer portion and a center portion becomes small immediately after completion of heating and hence, the treatment can be performed by setting a surface temperature immediately after the completion of heating as the steel plate center temperature.

As a means for reheating the steel plate after accelerated cooling, it is desirable to use induction heating which can effectively heat only a surface layer portion where a large amount of MA is present. However, a means for reheating the steel plate is not limited to such induction heating, and a heat treatment furnace can be also used. Further, to acquire an effect brought about by reheating, it is effective to heat the steel plate to a temperature higher than a temperature at the time of stopping cooling and hence, the steel plate center temperature at the time of reheating is preferably set to a temperature higher than a temperature at the time of stopping cooling by 50° C. or more.

Cooling Stop Temperature: 250 to 550° C.

When reheating is performed after accelerated cooling, even when MA is generated by accelerated cooling, MA is made unharmful. Accordingly, the accelerated cooling stopping temperature is set to a. value which falls within a range of 250° C. to 550° C. in terms of the steel plate surface temperature. The reason a lower limit of the accelerated cooling stopping temperature is set to 250° C. is that when the accelerated cooling stopping temperature becomes lower than 250° C., a generation amount of MA becomes excessive and hence, it becomes difficult to set a fraction of MA to 3% or less even when reheating is performed after accelerated cooling.

According to the fifth embodiment of the present invention, a steel pipe is manufactured using a steel plate which is manufactured by reheating the steel plate such that a steel plate surface temperature falls within a range of 550 to 720° C. and a steel plate center temperature becomes below 550° C. Accordingly, the steel pipe can acquire the higher compressive strength compared to the fourth embodiment.

Figure 1:
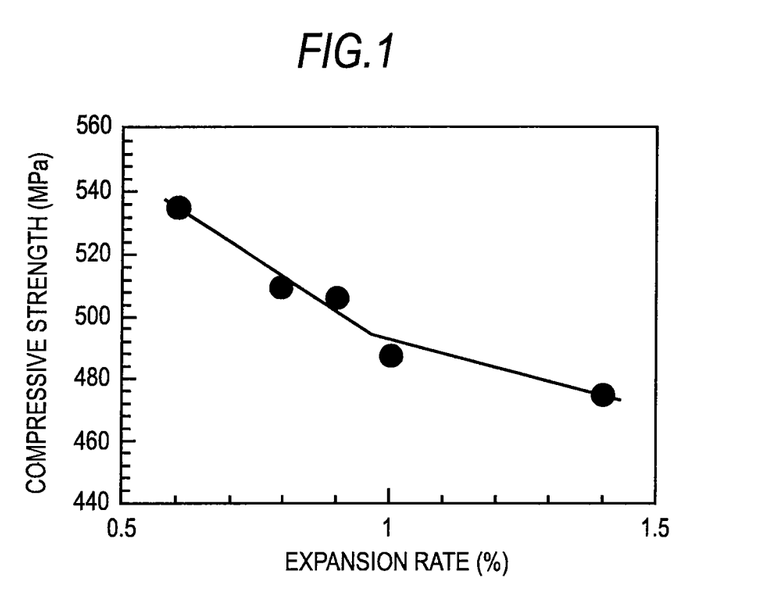
FIG. 1 is a view showing compressive strength when an expansion rate was changed in No. 8 (kind of steel: F) in Tables 1 to 3.
Figure 2:
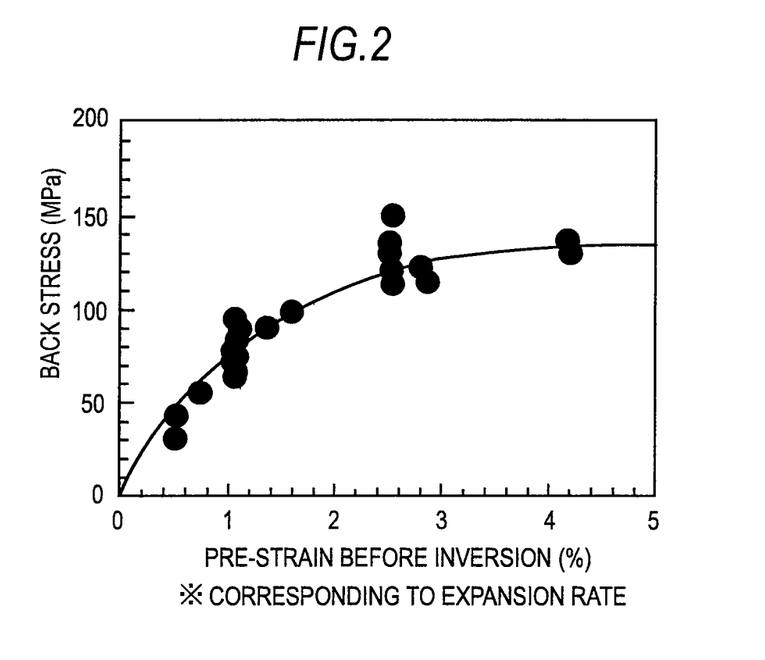
FIG. 2 is a view showing the relationship between pre-strain before inversion and back stress corresponding to an expansion rate obtained by repeatedly applying a load to a round bar tensile specimen cut out from a steel plate equivalent to No. 8 (kind of steel: F) in Tables 1 to 3.

According to embodiments of the present invention, a steel pipe is made using the steel plate manufactured by the above-mentioned method. With respect to a steel pipe forming method, the steel plate is formed into a steel pipe shape by cold forming such as a UOE process or press bend. Thereafter, seam welding is applied to the steel pipe. As a welding method used here, any welding method can be adopted provided that sufficient strength of joint and sufficient toughness of joint can be obtained. However, from viewpoints of excellent weld quality and excellent production efficiency, it is preferable to use submerged arc welding. After finishing welding of seams, the pipe expansion is performed for eliminating weld residual stress and for enhancing roundness of the steel pipe. In this pipe expansion, it is preferable to set an expansion rate to 0.4% or more as a condition for acquiring the steel pipe having predetermined roundness and for eliminating residual stress from the steel pipe. Further, when the expansion rate is excessively high, lowering of compressive strength caused by a Bauschinger effect is increased and hence, an upper limit of the expansion rate is set to 1.2%. Further, in the usual manufacture of a welded steel pipe, in general, an expansion rate is controlled to a value which falls within a range of 0.90 to 1.20% by focusing on securing roundness. On the other hand, from a view point of securing compressive strength, it is desirable that the expansion rate is low. FIG. 1 is a view showing compressive strength when the expansion rate was changed in No. 8 (kind of steel F) shown in Tables 1 to 3. As shown in FIG. 1, a remarkable compressive-strength improving effect is observed by setting the expansion rate to 0.9% or less and hence, the expansion rate is more preferably set to a value which falls within a range of 0.4 to 0.9%. The expansion rate is further preferably set to a value which falls within a range of 0.5 to 0.8%. The reason that the remarkable compressive-strength improving effect is observed by setting the expansion rate to 0.9% or less is that, as shown in FIG. 2, in the generation behavior of back stress in a steel material, the back stress is remarkably increased in a low strain region and, thereafter, the degree of increase of the back stress becomes small from approximately 1% and the generation of back stress is saturated at 2.5% or more. FIG. 2 is a view showing the relationship between pre-strain before inversion and back stress corresponding to an expansion rate which is obtained by repeatedly applying a load to round bar tensile specimens cut out from a steel plate substantially equal to the steel plate of No. 8 (kind of steel F) shown in Tables 1 to 3.

[Embodiment]

Slabs are manufactured from steels (kinds of steels A to N) having chemical compositions shown in Table 1 by a continuous casting process, and heavy-wall-thickness steel plates (No. 1 to 24) having plate thicknesses of 22 mm to 34 mm were manufactured using the slabs. Manufacturing conditions of the steel plates are shown in Table 2. In reheating treatment at the time of manufacturing the steel plate, reheating was performed using an induction heating furnace which is mounted on the same line as an accelerated cooling facility. A surface layer temperature at the time of reheating is a surface temperature of the steel plate at an exit of the induction heating furnace, and a steel plate temperature at a point of time that a surface layer temperature and a center temperature become substantially equal to each other after heating is set as the center temperature. Using these steel plates, steel pipes having various diameters were manufactured by a UOE process. An expansion rate at the time of manufacturing steel pipes is also shown in Table 2.

With respect to tensile property of the steel pipe manufactured as described above, a tensile test was carried out using a whole thickness specimen in the pipe circumferential direction as a tensile specimen, and tensile strength of the specimen was measured. In a compression test, a specimen having a diameter of 20 mm and a length of 60 mm was sampled from the steel pipe in the pipe circumferential direction at a position on an inner surface side of the steel pipe, and the compression test was carried out so as to measure compressive yield strength (or 0.5% proof strength). Further, using a DWTT specimen sampled from the steel pipe in the pipe circumferential direction, a temperature at which a shear area becomes 85% was obtained as 85% SATT (Shear Area Transition Temperature). The DWTT test was performed using a thickness-reduced specimen having a thickness of 19 mm when a pipe thickness is 30 mm or more. In measuring the fracture toughness of the weld, Charpy impact specimens were sampled from an outer surface heat affected zone of a seam weld, a Charpy test was applied to three Charpy impact specimens at a temperature of −30° C., and an average of absorption energies when the Charpy test was performed was set as the fracture toughness of the weld. With respect to the metal microstructure, a specimen was sampled from a position of ¼ of a plate thickness on an inner surface side of the steel pipe, the specimen was etched using nital after polishing, and the metal microstructure was observed using an optical microscope. Then, using five photographs taken at magnification of 200 times, a fraction of bainite was obtained by an image analysis. When a ferrite phase is present, out of ferrite grains, grains in which a deformation band is observed are determined as rolled ferrite, and an area fraction of the rolled ferrite is acquired. In the observation of MA, after etching the specimen using nital, electrolytic etching (two-step etching) was applied to the specimen and, thereafter, the microstructure was observed using a scanning electron microscope (SEM). Then, using photographs taken at magnification of 1000 times, an area fraction, an average grain size and an aspect ratio of MA were obtained by an image analysis.

An HIC test (hydrogen induced cracking test) was performed with respect to numbers 20, 21, 22. A specimen is immersed in artificial sea water having pH of approximately 5 with saturated hydrogen sulfide ($H_2S$) for 96 hours and, thereafter, the presence or the non-presence of cracks on the whole surface of the specimen was investigated by ultrasonic inspection, and the HIC resistance performance was evaluated based on a crack area ratio (CAR). Here, three specimens were sampled from respective steel pipes, and these specimens were subjected to the HIC test. A maximum value among crack area ratios of the individual specimen was adopted as the crack area ratio representing the steel pipe.

Mechanical properties of the steel pipes are shown in Table 3. In all of No. 1 to 8, 20 to 24 which are examples of the present invention, the chemical composition, the manufacturing method and the microstructure were within the scope of the present invention. Also No. 1 to 8, 20 to 24 exhibited high compressive strength of 430 MPa or more, favorable DWTT property (−20° C. or below) and the favorable fracture toughness of the weld (100 J or more). Further, No. 20, 21, 22 possess excellent sour resistance performance where crack area ratio is 1% or less in an HIC test.

On the other hand, in No. 9 to 14, although the chemical composition was within the scope of the present invention, the manufacturing method was outside the scope of the present invention and hence, No. 9 to 14 were inferior to the present invention example with respect to any one of compressive strength, DWTT property and the fracture toughness of the weld. In No. 15 to 19, the chemical composition falls outside the scope of the present invention and hence, No. 15 to 19 were inferior to the present invention examples with respect to strength or fracture toughness of the weld or exhibit insufficient compressive strength.

According to the present invention, it is possible to acquire a steel pipe having a heavy wall thickness which has high compressive strength, excellent DWTT property and excellent fracture toughness of the weld and hence, the steel pipe is applicable to a linepipe for deep-sea which is required to exhibit high collapse resistant performance. Further, it is also possible to manufacture a steel pipe which also possesses excellent sour resistance performance.

TABLE 1

| Kind of steel | Chemical composition (mass %) | | | | | | | | | | |
|---|---|---|---|---|---|---|---|---|---|---|---|
| | C | Si | Mn | P | S | Al | Nb | Ti | Mo | Ni | Cr |
| A | 0.065 | 0.02 | 1.85 | 0.012 | 0.0022 | 0.030 | 0.025 | 0.009 | — | — | — |
| B | 0.080 | 0.28 | 1.68 | 0.009 | 0.0018 | 0.024 | 0.029 | 0.011 | 0.19 | — | — |
| C | 0.074 | 0.13 | 1.67 | 0.009 | 0.0014 | 0.025 | 0.012 | 0.010 | 0.10 | 0.09 | — |
| D | 0.069 | 0.11 | 1.63 | 0.008 | 0.0007 | 0.030 | 0.012 | 0.010 | 0.09 | 0.69 | 0.08 |
| E | 0.067 | 0.04 | 1.63 | 0.005 | 0.0018 | 0.024 | 0.013 | 0.009 | 0.11 | 0.22 | 0.20 |
| F | 0.052 | 0.15 | 1.74 | 0.003 | 0.0005 | 0.031 | 0.025 | 0.014 | — | 0.27 | 0.18 |
| L | 0.063 | 0.05 | 1.70 | 0.004 | 0.0005 | 0.035 | 0.022 | 0.011 | — | 0.15 | — |
| M | 0.072 | 0.10 | 1.60 | 0.006 | 0.0006 | 0.020 | 0.028 | 0.012 | 0.02 | 0.11 | — |
| N | 0.055 | 0.08 | 1.55 | 0.004 | 0.0005 | 0.025 | 0.025 | 0.010 | — | — | 0.25 |
| G | <u>0.120</u> | 0.26 | 1.54 | 0.013 | 0.0023 | 0.033 | 0.032 | 0.008 | 0.11 | — | — |
| H | 0.064 | <u>0.48</u> | 1.65 | 0.010 | 0.0018 | 0.028 | 0.026 | 0.011 | 0.18 | 0.10 | — |
| I | 0.065 | 0.12 | 1.58 | 0.012 | 0.0020 | 0.034 | <u>0.048</u> | 0.014 | 0.23 | — | 0.13 |
| J | 0.032 | 0.22 | 1.65 | 0.005 | 0.0015 | 0.033 | 0.030 | 0.010 | 0.29 | — | — |
| K | 0.045 | 0.15 | 1.35 | 0.004 | 0.0005 | 0.033 | 0.021 | 0.012 | 0.08 | — | — |

| Kind of steel | Chemical composition (mass %) | | | | | | $Ar_3$ | Remarks |
|---|---|---|---|---|---|---|---|---|
| | Cu | V | Ca | N | C* | Ceq | (° C.) | |
| A | — | — | — | 0.0031 | 0.063 | 0.37 | 742 | Present |
| B | — | 0.023 | — | 0.0028 | 0.072 | 0.40 | 736 | invention |
| C | — | — | 0.0023 | 0.0042 | 0.071 | 0.38 | 741 | example |
| D | — | — | 0.0021 | 0.0045 | 0.066 | 0.42 | 712 | |
| E | — | — | 0.0011 | 0.0038 | 0.063 | 0.42 | 735 | |
| F | 0.23 | 0.035 | — | 0.0029 | 0.048 | 0.42 | 733 | |
| L | 0.27 | — | 0.0024 | 0.0035 | 0.062 | 0.37 | 741 | |
| M | 0.29 | 0.040 | 0.00 | 0.0041 | 0.067 | 0.38 | 746 | |
| N | 0.35 | 0.030 | 0.00 | 0.0040 | 0.052 | 0.39 | 758 | |
| G | — | — | — | 0.0032 | 0.115 | 0.40 | 741 | Comparison |
| H | — | 0.042 | — | 0.0044 | 0.055 | 0.39 | 738 | example |
| I | — | — | — | 0.0041 | 0.056 | 0.40 | 743 | |
| J | — | 0.07 | 0.0023 | 0.0047 | <u>0.019</u> | 0.38 | 745 | |
| K | — | 0.033 | — | 0.0030 | 0.040 | <u>0.29</u> | 782 | |

Underlined parts: values outside the scope of the present invention
C* = C(%) − 0.065Nb(%) − 0.025Mo(%) − 0.057V(%) [respective element symbols indicate contents (mass %)]
Ceq = C + Mn/6 + (Cu + Ni)/15 + (Cr + Mo + V)/5 [respective element symbols indicate contents (mass %)]
$Ar_3$ (° C.) = 910 − 310C(%) − 80Mn(%) − 20Cu(%) − 15Cr(%) − 55Ni(%) − 80Mo(%) [respective element symbols indicate contents (mass %)]

TABLE 2

| | | Steel pipe size | | | Rolling reduction in non-re-crystal-lization | Rolling com- | Accel-erated cooling | Accel-erated cooling | Accel-erated cooling | | Reheating temperature (° C.) | | | |
|---|---|---|---|---|---|---|---|---|---|---|---|---|---|---|
| | | Outer di- | Wall thick- | Slab heating temper- | temper-ature | pletion temper- | start temper- | start temper- | stop temper- | Cooling | | | Expansion | |
| No. | Kind of steel | ameter (mm) | ness (mm) | ature (° C.) | range (%) | ature (° C.) | ature (° C.) | ature-Ar₃ (° C.) | ature (° C.) | rate (° C./sec) | Surface | Center | rate (%) | Remarks |
| 1 | A | 762 | 30 | 1100 | 75 | 766 | 748 | 6 | 380 | 23 | 640 | 445 | 0.8 | Present |
| 2 | B | 610 | 30 | 1100 | 75 | 765 | 740 | 4 | 370 | 21 | — | — | 1.0 | invention |
| 3 | B | 610 | 30 | 1080 | 75 | 742 | 715 | −21 | 340 | 23 | 620 | 440 | 0.8 | example |
| 4 | C | 914 | 22 | 1070 | 75 | 810 | 740 | −1 | 405 | 35 | — | — | 1.0 | |
| 5 | C | 914 | 22 | 1100 | 75 | 765 | 725 | −16 | 400 | 32 | 600 | 525 | 0.8 | |
| 6 | D | 624 | 30 | 1080 | 75 | 725 | 707 | −5 | 390 | 22 | 570 | 405 | 1.0 | |
| 7 | E | 762 | 34 | 1100 | 75 | 740 | 723 | −12 | 410 | 20 | 650 | 495 | 1.0 | |
| 8 | F | 762 | 34 | 1100 | 65 | 755 | 735 | 2 | 420 | 18 | 610 | 460 | 1.0 | |
| 23 | F | 762 | 34 | 1100 | 65 | 755 | 735 | 2 | 420 | 18 | 610 | 460 | 0.6 | |
| 24 | F | 762 | 34 | 1100 | 65 | 755 | 735 | 2 | 420 | 18 | 610 | 460 | 0.9 | |
| 20 | L | 610 | 38 | 1100 | 70 | 780 | 750 | 9 | 370 | 17 | 600 | 460 | 0.8 | |
| 21 | M | 762 | 32 | 1080 | 70 | 775 | 745 | −1 | 430 | 21 | 620 | 480 | 1.1 | |
| 22 | N | 762 | 22 | 1120 | 71 | 800 | 760 | −2 | 420 | 35 | 560 | 440 | 0.8 | |
| 9 | B | 610 | 30 | 1100 | 75 | 768 | 743 | 7 | 360 | <u>8.5</u> | — | — | 1.0 | Comparison |
| 10 | B | 610 | 30 | 1080 | 75 | 765 | 742 | 6 | 280 | 23 | <u>520</u> | 370 | 1.0 | example |
| 11 | D | 624 | 30 | 1050 | 75 | 690 | 670 | <u>−42</u> | 400 | 23 | — | — | 1.0 | |
| 12 | D | 624 | 30 | 1050 | 75 | 720 | 705 | −7 | <u>220</u> | 28 | — | — | 0.9 | |
| 13 | D | 624 | 30 | 1100 | <u>50</u> | 738 | 720 | 8 | 420 | 22 | 580 | 415 | 0.9 | |
| 14 | D | 624 | 30 | 1100 | 75 | 742 | 725 | 13 | <u>595</u> | 23 | — | — | 1.0 | |
| 15 | <u>G</u> | 762 | 30 | 1050 | 75 | 780 | 756 | 15 | 370 | 24 | — | — | 1.0 | |
| 16 | <u>H</u> | 762 | 30 | 1100 | 75 | 795 | 762 | 24 | 400 | 22 | — | — | 1.0 | |
| 17 | <u>I</u> | 762 | 30 | 1050 | 75 | 780 | 755 | 12 | 400 | 22 | — | — | 1.0 | |
| 18 | <u>J</u> | 762 | 22 | 1050 | 75 | 765 | 740 | −5 | 380 | 38 | — | — | 1.0 | |
| 19 | <u>K</u> | 762 | 30 | 1100 | 75 | 825 | 793 | 11 | 385 | 24 | — | — | 1.0 | |

Underlined parts indicate values outside the scope of the present invention.

TABLE 3

| | Metal microstructure | | | | | | | Fracture | | | |
|---|---|---|---|---|---|---|---|---|---|---|---|
| No. | Bainite fraction (%) | Rolled ferrite fraction (%) | MA fraction (%) | Average grain size of MA (μm) | Aspect ratio of MA | Tensile strength (MPa) | Compressive yield strength (Mpa) | DWTT property 85% SATT (° C.) | toughness of weld vE-30° C. (J) | HIC property of steel pipe Crack area ratio (%) | Remarks |
| 1 | 95 | 0 | 1.6 | 1.4 | 2.9 | 625 | 466 | −28 | 96 | — | Present |
| 2 | 96 | 0 | 2.2 | 1.7 | 3.8 | 643 | 463 | −22 | 68 | — | invention |
| 3 | 72 | 0 | 0.8 | 0.9 | 2.4 | 635 | 487 | −35 | 72 | — | example |
| 4 | 93 | 0 | 1.8 | 1.3 | 4.5 | 652 | 473 | −32 | 130 | — | |
| 5 | 67 | 3 | 1.6 | 0.6 | 2.4 | 638 | 486 | −25 | 155 | — | |
| 6 | 85 | 0 | 2.0 | 1.2 | 3.8 | 630 | 465 | −28 | 162 | — | |
| 7 | 83 | 4 | 0.6 | 0.8 | 1.8 | 645 | 483 | −35 | 190 | — | |
| 8 | 97 | 0 | 0.8 | 1.0 | 2.7 | 663 | 488 | −24 | 155 | — | |
| 23 | 97 | 0 | 0.8 | 1.0 | 2.7 | 659 | 535 | −26 | 161 | — | |
| 24 | 97 | 0 | 0.8 | 1.0 | 2.7 | 661 | 505 | −26 | 160 | — | |
| 20 | 92 | 0 | 1.2 | 1.1 | 2.5 | 643 | 490 | −25 | 120 | 0 | |
| 21 | 89 | 0 | 0.8 | 0.9 | 2.4 | 633 | 472 | −30 | 102 | 1 | |
| 22 | 92 | 0 | 0.7 | 1.0 | 2.2 | 601 | 450 | −28 | 99 | 0 | |
| 9 | 96 | 0 | <u>4.0</u> | <u>3.4</u> | 3.9 | <u>586</u> | <u>402</u> | <u>−16</u> | 72 | — | Comparison |
| 10 | 96 | 0 | <u>3.5</u> | 1.5 | 3.5 | 652 | <u>422</u> | −25 | 83 | — | example |
| 11 | <u>45</u> | 34 | 2.5 | 2.1 | 3.4 | 655 | <u>406</u> | −38 | 170 | — | |
| 12 | 85 | 0 | <u>4.5</u> | 2.8 | <u>5.8</u> | 650 | <u>413</u> | −42 | 165 | — | |
| 13 | 95 | 0 | 2.4 | <u>3.4</u> | <u>5.2</u> | 637 | <u>428</u> | −30 | 173 | — | |
| 14 | 95 | 0 | <u>4.2</u> | 1.8 | 3.9 | 615 | <u>425</u> | −25 | 162 | — | |
| 15 | 94 | 0 | <u>5.1</u> | <u>3.4</u> | <u>6.4</u> | 635 | <u>421</u> | <u>−5</u> | <u>34</u> | — | |
| 16 | 95 | 0 | <u>4.6</u> | 2.8 | <u>5.2</u> | 624 | <u>418</u> | −28 | <u>45</u> | — | |
| 17 | 97 | 0 | 2.8 | 1.9 | 3.8 | 662 | 453 | −25 | <u>72</u> | — | |

TABLE 3-continued

| | Metal microstructure | | | | | Mechanical properties of steel pipe | | | | |
|---|---|---|---|---|---|---|---|---|---|---|
| | | | | | | | | Fracture | | |
| No. | Bainite fraction (%) | Rolled ferrite fraction (%) | MA fraction (%) | Average grain size of MA (μm) | Aspect ratio of MA | Tensile strength (MPa) | Compressive yield strength (Mpa) | DWTT property 85% SATT (° C.) | toughness of weld vE-30° C. (J) | HIC property of steel pipe Crack area ratio (%) | Remarks |
| 18 | 88 | 3 | 2.3 | 1.5 | 3.4 | 625 | <u>426</u> | −38 | 131 | — |
| 19 | 96 | 0 | 0.8 | 1.2 | 2.1 | <u>540</u> | <u>385</u> | −35 | 175 | — |

Fraction (%) means area fraction.
Underlined parts indicate values outside the scope of the present invention.

The invention claimed is:

1. A welded steel pipe for a linepipe having a composition which contains by mass % 0.03 to 0.10% C, 0.15% or less Si, 1.50 to 2.00% Mn, 0.015% or less P, 0.003% or less S, 0.080% or less Al, 0.005 to 0.035% Nb, 0.005 to 0.020% TI, and Fe and unavoidable impurities as a balance, wherein C(%)—0.065Nb(%) is 0.025 or more, and
a Ceq value is 0.36 or more, and
the steel pipe has metal microstructure where an area fraction of bainite is 60% or more, an area fraction of rolled ferrite is 5% or less, an area fraction of M-A constituent (MA) is 0.6 to 3%, an average grain size of MA is 2μm or less, and an aspect ratio of MA is 5 or less,
wherein the Ceq value is expressed by the formula:

Ceq=C(%)+Mn(%)/6+{Cr(%)+Mo(%)+V(%)}/5+{(Cu(%)+NI(%)}/15.

2. The welded steel pipe for a linepipe according to claim 1, wherein the composition further contains by mass % one or more kinds selected from a group consisting of 0.5% or less Cu, 1% or less Ni, 0.5% or less Cr, 0.5% or less Mo and 0.1% or less V, and C(%) −0.065Nb(%)−0.025Mo(%)−0.057V(%) is 0.025 or more.

3. The welded steel pipe for a linepipe according to claim 1, wherein the composition further contains by mass % one or more kinds selected from a group consisting of 0.20 to 0.40% Cu, 0.05 to 1.00% Ni, 0.0005 to 0.0035% Ca, 0.50% or less Cr, 0.50% or less Mo and 0.10% or less V, and C(%)−0.065Nb(%)−0.025Mo(%)−0.057V(%) is 0.025 or more.

4. A method of manufacturing a welded steel pipe for a linepipe according to claim 1, wherein a steel plate is heated to a temperature which falls within a range of 1000 to 1200° C., is subjected to hot rolling where a rolling reduction rate in a non-recrystallization temperature range is set to 60% or more and a rolling completion temperature is $Ar_3$ or above and, subsequently, is subjected to accelerated cooling at a cooling rate of 10° C/sec or more from a temperature of ($Ar_3$−30° C.) or above until a steel plate surface temperature falls within a range of 350 to 550° C. thus manufacturing a steel plate, the steel plate is formed into a steel pipe shape by cold forming, welding is applied to seams of the steel pipe, and the steel pipe is subjected to pipe expansion with an expansion rate of 0.4% to 1.2%.

5. A method of manufacturing a welded steel pipe for a linepipe according to claim 1, wherein a steel plate is heated to a temperature which falls within a range of 1000 to 1200° C., is subjected to hot rolling where a rolling reduction rate in a non-recrystallization temperature range is set to 60% or more and a rolling completion temperature is $Ar_3$ or above and, subsequently, is subjected to accelerated cooling at a cooling rate of 10° C/sec or more from a temperature of ($Ar_3$−30° C.) or above until a steel plate surface temperature falls within a range of 250 to 550° C. and, subsequently, is subjected to reheating such that a steel plate surface temperature falls within a range of 550 to 720° C., and a steel plate center temperature becomes below 550° C. thus manufacturing a steel plate, the steel plate is formed into a steel pipe shape by cold forming, welding is applied to seams of the steel pipe, and the steel pipe is subjected to pipe expansion with an expansion rate of 0.4% to 1.2%.

* * * * *